United States Patent [19]

Meyer et al.

[11] Patent Number: 4,939,370
[45] Date of Patent: Jul. 3, 1990

[54] METHOD OF AND DEVICE FOR INSPECTING AND/OR CONTROLLING METALLIZATION PROCESSES

[75] Inventors: Heinrich Meyer; Waldfried J. L. Plieth; Martin Kurpjoweit, all of Berlin, Fed. Rep. of Germany

[73] Assignee: Schering Aktiengesellschaft, Berlin and Bergkamen, Fed. Rep. of Germany

[21] Appl. No.: 266,382

[22] Filed: Nov. 2, 1988

[30] Foreign Application Priority Data

Nov. 2, 1987 [DE] Fed. Rep. of Germany ....... 3737489

[51] Int. Cl.⁵ .................... G05B 11/00; G01N 21/51; G01N 27/26
[52] U.S. Cl. .................... 250/372; 204/14.1; 250/341; 427/10
[58] Field of Search ................ 250/372, 341; 356/446, 356/371; 427/10, 8, 438, 437; 204/1 T

[56] References Cited

U.S. PATENT DOCUMENTS

| 4,073,964 | 2/1978 | Herrmann | 427/10 |
| 4,311,725 | 1/1982 | Holland | 427/10 |
| 4,583,861 | 4/1986 | Yamaji et al. | 356/446 |
| 4,624,857 | 11/1986 | Dahms | 427/8 |
| 4,653,908 | 3/1987 | Yajima et al. | 356/51 |
| 4,692,346 | 9/1987 | McBride et al. | 427/8 |
| 4,831,324 | 5/1989 | Asakura et al. | 324/57 R |

FOREIGN PATENT DOCUMENTS 896401 1/1982 U.S.S.R. ............... 356/371

Primary Examiner—Constantine Hannaher
Attorney, Agent, or Firm—Michael J. Striker

[57] ABSTRACT

A method for checking and/or controlling a metallization process in a galvanizing or chemical is based on the measurement of light scattered off or reflected from a surface portion being metallized. A deviation from a predetermined nominal value of the scattered or reflected light intensity serves for controlling at least one process parameter to neutralize the deviation.

37 Claims, 2 Drawing Sheets

METHOD OF AND DEVICE FOR INSPECTING AND/OR CONTROLLING METALLIZATION PROCESSES

BACKGROUND OF THE INVENTION

The present invention relates to a method of inspecting and/or controlling a process of metallization of a surface, and to a device for carrying out the method.

Prior art methods for inspecting metallization processes have been limited mostly to a bath analysis or to electrochemical, cyclic volt-ampere measurements. The known methods permit only a very indirect determination of the metallization bath quality and of the properties of the metallized layer. In the analytical method it cannot be guaranteed that all process relevant chemical compounds have been included; in practice it has been found that heaved up, frequently unknown compounds produce extraordinary problems for the quality of the deposited metallization layers. Moreover, due to the large number of compounds which participate in the determination of the quality of the deposited layers, a process control based on the concentration of individual components is very problematic.

The method of the cyclic volt-ampere measurements in which primarily the redissolving of a minute amount of the deposition on an inner electrode is tested, represents a more direct approach to the processes on the electrodes. However this method delivers directly interpretable data which could be used for controlling the metallization process only in very limited scope and, in addition, is susceptible to interferences caused by even the smallest contaminants.

SUMMARY OF THE INVENTION

It is therefore a general object of the present invention to overcome the aforementioned disadvantages.

More particularly, it is an object of the invention to provide an improved method of and a device for checking and/or controlling a process of metallization of a surface which makes it possible to directly determine all characteristic parameters of a metallization process by means of an in situ measurement, thus enabling a comprehensive and momentary control and/or supervision of this process wherein all parameters which are relevant for the technological properties of the deposited layer are detected.

In keeping with these objects and others which will become apparent hereafter, one feature of the method of this invention resides in the steps of exposing a surface portion being metallized to a reference radiation, measuring the amount of radiation which is scattered or reflected from said surface portion to determine a deviation from a nominal value, and varying parameters of the metallization process to neutralize the measured deviation.

The device for inspecting and/or controlling a process of metallization of a surface, comprises a source of radiation for generating a beam of a monochromatic, substantially coherent electromagnetic radiation, preferably in the visible or ultraviolet energy range, a first optical means for focusing the radiation beam on a surface portion being metallized, a second optical means for collecting the part of radiation beam that is directly reflected or diffused or scattered from the irradiated metal layer on the surface portion, and a radiation detector for measuring intensity of radiation collected by the second optical means.

The method of this invention is based on an observation that hitherto has not been known, namely that the intensity of light scattered from or also directly reflected from the deposited metal layer depends on optical properties of the metal layer and is affected in a very characteristic manner by the microstructure or microtexture of the deposited surface layer. The microstructure or microtexture is conditioned almost by all technological properties of the deposited metal, for example by its ductility, hardness, corrosion resistance and optical appearance among others.

The method of this invention is carried out by means of a scattered light measuring apparatus which operates according to the principle of the light scattering on a surface portion being metallized; by means of the scattered light measurement the quality both of galvanically and of chemically deposited metal layers can be monitored in situ. If desired, the measurement of the scattered light can be coupled with a complete electrochemical testing arrangement. The latter combination makes it possible to measure the scattered light under exactly defined electrochemical conditions. These conditions are predetermined by the potential and current density; at the same time they can be also characterized by electrochemical measurements, also by those which are time dependent, as well as by measurements of the complex impedance for alternating current and of the current/time behavior after a change of the potential.

The testing can be performed either by means of taking discrete samples or measurements or continuously by using a throughflow apparatus. The measured scattered light shows the optical quality or condition of the measured surface and in addition provides a picture of the crystallinity and of the microtexture of the deposited metal layer. In this manner it is achievable to determine in situ for example the quality of a metallization bath and by controlling its parameters, to control the deposited metal layer.

The technological possibilities of the method of this invention are considerable. For example, the method enables the control of instant metal deposition under the presentation of all electrochemical metallization parameters, which feature has not been possible in prior art processes of this kind.

Further advantageous application possibilities are as follows:

A new principle of monitoring galvanical or chemical metal depositing processes;

The coupling of the method of this invention with classical electrochemical methods based on current/potential recording in time dependent quasi stationary or cyclic manner;

The coupling with measurement of the complex impedance for alternating currents; and The coupling with the simultaneous registration or recording of the current/time course.

In addition, the invention makes it possible to supervise or control the metal deposition by means of different prior art methods whose parameters are regulated in response to the evaluation of the measured values of the reflected or scattered radiation intensity whereby the total intensity refers to within a narrow circle cutout from the impinging light beam.

It is possible to measure time variations of the total intensity and evaluate the same. Also, characteristic points or regions of the time dependency of the total intensity, such as for example maxima, minima, half width of maxima and minima intensity, turning points, steepness of the curves, integrated intensity-/time functions can also be determined and evaluated.

Furthermore, it is possible to evaluate:

Interference structures within a defined circle of scattering around the impinging light beam and the time variations of this interference structure;

The intensity of reflected light and the time course of the changes of the reflected light intensities;

Characteristic points or regions of the time dependency of the directly reflected intensity, for example maxima, minima, half width of maxima and minima, turning points, steepness of curves, integrated intensity-/time functions;

The change of the directly reflected intensity versus the energy of the impinging radiation;

The time variations of the reflection spectrum, particularly the time variation of the structures in the reflection spectrum such as maxima, minima, and half width.

Of advantage is also the feedback of the measured data for the control of the metallization process. If desired the measured data can be stored and evaluated in a microprocessor and then directly fed into the metallization bath to influence the process. Parameters which can be controlled in this manner are the current density during the metal deposition, the electrode potential, the temperature, the composition of the bath and the convection in the bath among others.

The method of this invention can be applied with a particular advantage for all current metallization processes, particularly for:

The processes of the galvanic metal deposition from a fluid, aqueous or non-aqueous phase;

The currentless metallization, that means the chemical autocatalytic reduction of metal ions on activated upper surfaces;

Metallization processes under the action of light; and all variations of the above processes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
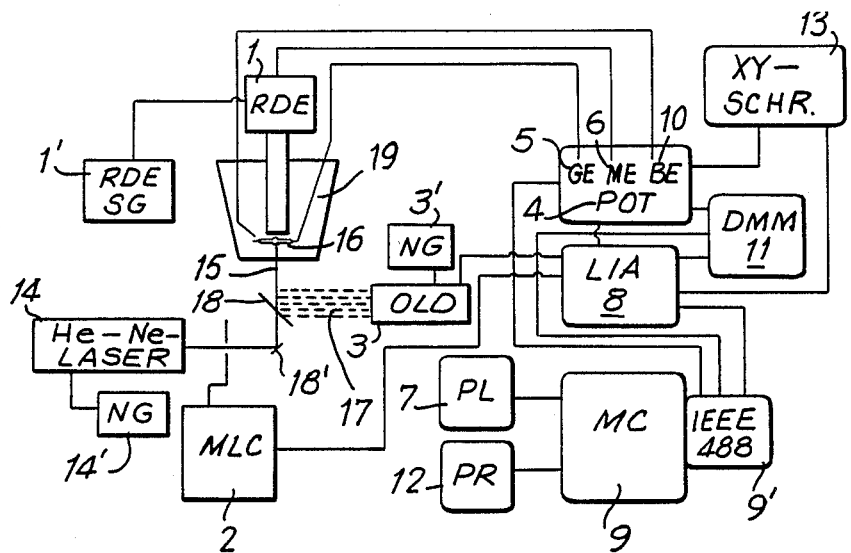
FIG. 1 shows schematically a circuit diagram of the device for checking and/or controlling a process of metallization of a surface.

Referring firstly to FIG. 1, RDE indicates a rotary disc electrode 1, RDE SG indicates a control apparatus and power supply 1' for the RDE; MLC indicates a mechanical light beam chopper 2; OLD indicates an optical light detector 3 with a power supply NG 3';
POT a potentiometric device or a potentio-stat 4 with an interface; GE, ME and BE indicative of a counterelectrode 5, a measuring electrode 6 and a reference electrode 10; PL indicates a plotter; LIA indicates a 2-phase lock-in amplifier 8; MC indicates a microcomputer 9 having a IEEE 488 interface 9'; DMM indicates a digital multimeter 11; PR is a printer 12; and XY-Schr indicates a plotter 13.

The device of this invention includes a light source 14, preferably in the form He/Ne-laser or a tunable color substance laser having a broad frequency range. The light emanating from the light source 14 is transmitted perpendicularly or deviated at an angle to impinge preferably in the form of focused light beam 15 on a surface 16 being metallized in a bath 19. The angle of incidence of the transmitted light beam can be varied by means of suitable optical means, such as lenses or reflecting mirror 18! If desired the transmitted light beam 15 can be chopped up by a mechanical chopper 2. The amount of light 17' scattered or reflected from the surface 16 is measured either under a characteristic angle to the surface 16 whereby the angle can be varied within broad range or as illustrated in FIG. 1 the light 17' which has been scattered or reflected over a wide variety of angles, is focused and integrated into a measuring light beam 17. The focusing and collecting or integration of the light 17' can be carried out by means of lenses and/or mirror 18. The intensity of the light reflected by the mirror 18 is measured by light intensity measuring detector 3. The light intensity measuring detector is coupled to an integrated electrochemical measuring arrangement including a component potentiometric device or potentio-stat 4, a function generator for generating the controlling potentials, a lock-in amplifier 8 for measuring extremely low intensities of the scattered reflected light and simultaneously measuring the complex impedances of the alternating current, a transient recorder for measuring the time pulse of the scattered reflected light and simultaneously the time course of the current and of capacity. For the reception of the bath of electrolyte 19, modified electrochemical standard cells provided with a measuring electrode 6, a reference electrode 10 and a counterelectrode 5 can be employed. In the containers or cells of this kind separate samples can be tested. Alternatively, the measuring apparatus can be also made in the form of a through-flow cell for an automatic on line monitoring of the bath 19, as indicated in FIG. 1. The automatic inspection or control is performed by electronic devices controlled by the microprocessor 9 whose input and output interface 9' serves for receiving the detected data and outputting the processed data for controlling the corresponding changes of the process parameters.

Figure 2:
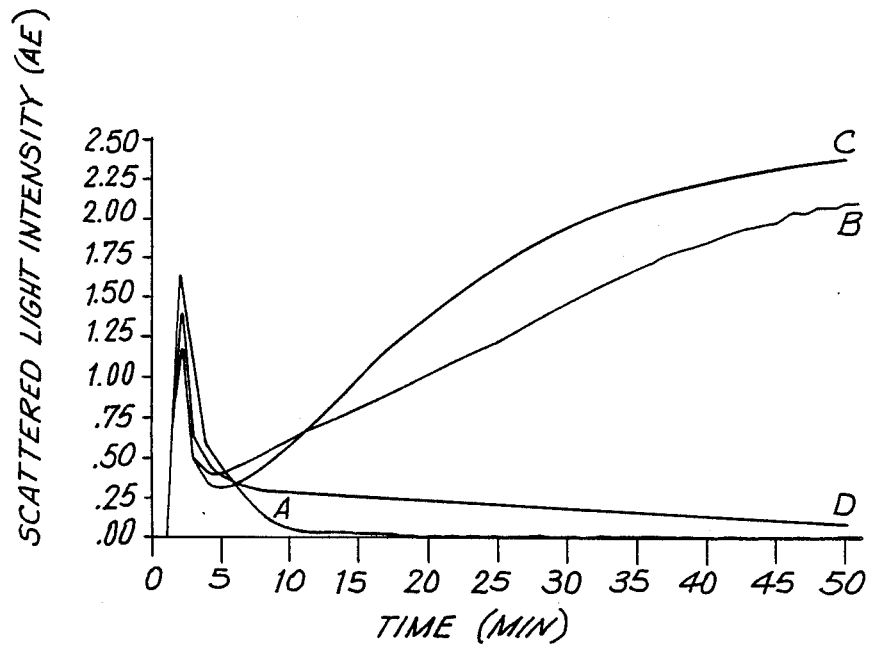
FIG. 2 shows a time plot of scattered light intensity for a metallization bath including three different amounts of an inhibitor solution.

FIG. 2 illustrates the time variation of the intensity of the measured scattered light in a metallization process using current density of 25 mA/cm$^2$ in a basic electrolyte+35.0 mg/1 chloride+4 ml of wetting agent solution and an additive of the following amounts of an inhibitor solution per each liter of electrolyte: (A) 0.0 ml; (B) 0.2 ml; (C) 1.0 ml; and (D) 2.0 ml of the inhibitor solution per liter.

Figure 3:
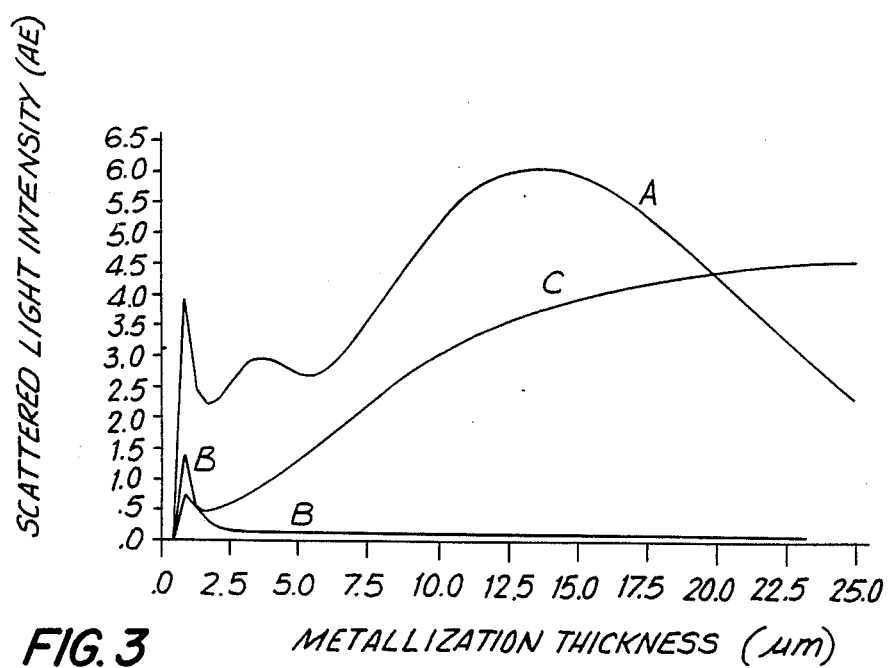
FIG. 3 is a plot diagram of scattered light intensity versus the thickness of a metallization layer for different types of metallization baths.

FIG. 3 illustrates a plot diagram of the changes of the measured scattered light intensity at 25 mA/cm$^2$ of the current density versus the thickness of the deposited layer for: (A) a production bath; (B) another production bath; (C) new charge of a galvanic copper bath.

Figure 4:
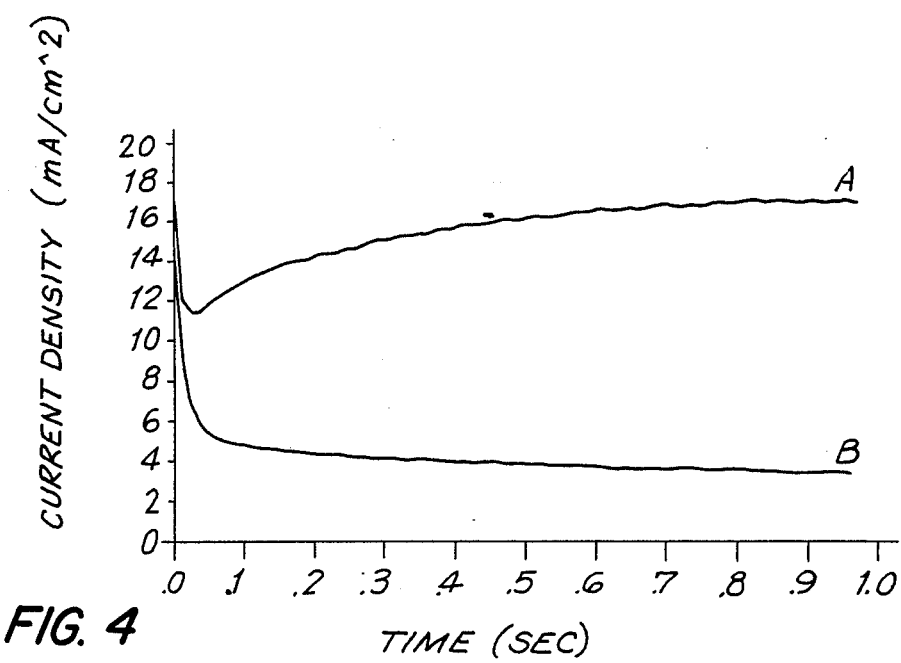
FIG. 4 is a time plot of the current density for two production baths of FIG. 3.

FIG. 4 shows a time plot of the current density at 150 mV versus NHE for the production bath (A) and the production bath B of FIG. 3.

The following examples are presented for the explanation of the control of galvanic and chemical metallization processes in accordance with this invention.

EXAMPLE 1

The method can be used for supervising an acid copper bath a typical composition of which consists of:
- 50–100 g/l of copper as $CuSO_4 \times 5\ H_2O$;
- 50–200 g/l of sulfuric acid concentrated;
- 0.05 g/l of sodium chloride; and
- 15 ml/l of a conventional polish or luster generator on the basis of desulfidepolyglycol.

The metal deposition is periodically taken up on an inert electrode made for example of platinum, gold, retort carbon, and the like. After a certain time period (typically 10 to 100 seconds) the deposited amount of metal is reoxidated. For long term tests a copper electrode can be employed. The electrolytic bath is operated at a typical current density of 5 $A/dm^2$. From a large number of measurements, a typical time course of the measured scattered light intensity, integrated over a circular segment, is illustrated in FIG. 2.

For determining the quality of the bath in this case the inclination of the curve after passing the first maximum can be evaluated: the curves B and C in FIG. 2 correspond to a good bath. Curves A and D indicate unusable deposits or precipitation. The conclusions from the scattered light measurements can be further supported by evaluating other measurements. For this prupose, ground or polished sections, the optical appearance and hardness of the deposited material are suitable which in all cases can be correlated with typical differences of the reflection/time course. Differences can be also recorded in the electrochemical measurements which complement the reflection measurements. FIG. 3 illustrates a current density/time function after a potential search in the range of the metal deposition on platinum. FIG. 4 illustrated the corresponding scattered light-time function of two typical production baths: A still intact, B greatly exhausted; C in FIG. 4 shows the curve of scattered light of a new introduced bath. From the ascent of the scattered light/time function to the first maximum (positive or negative) the bath can be evaluated. The corresponding course of the current support this finding, nevertheless they are less characteristic.

EXAMPLE 2

Electrolytic deposition of nickel from a typical nickel bath of the following composition:
- 60–100 g/l of nickel as nickel sulfate $NiSO_4$ and nickel chloride $NiCl_2$;
- 30–40 g/l $H_3BO_3$ of boric acid;
- Conventional bath additives at 250–1000 $A/m^2$ and 40°–70° C.

EXAMPLE 3

Electrolytic deposition of zinc from a typical cyanide zinc bath of the composition:
- 20–60 g/l of zinc as zinc sulfate $ZnSO_4$;
- 50–150 g/l NaCN sodium cyanide;
- 60–140 g/l NaOH sodium hydroxide;
- 20–120 g/l $Na_2CO_3$ sodium carbonate;
- Conventional bath additives at 40–400 $A/m_2$ current density and 20°–50° C.

EXAMPLE 4

Electrolytic deposition of gold from a typical cyanide gold bath of the composition:
- 3–18 g/l gold $KAu(CN)_2$;
- 15–45 g/l KCN potassium cyanide;
- 10–30 g/l KOH potassium hydroxide;
- Conventional bath additives at 10–50 $A/m^2$ current density and 50°–70° C.

EXAMPLE 5

Currentless deposition of copper from a typical bath having the composition:
- 5–100 g/l copper as $CuSO_4 \times 5\ H_2O$;
- 25–100 g/l $KNaC_4H_4O_6 \times 4\ H_2O$ potassium-sodium-tartrate;
- 4–50 g/l KOH potassium hydroxide In this case the condition of electrodes is predetermined by the mixing potential of the Redox components of the electrolyte. By coupling the reflection measurement with complete control of the electrochemical parameters this condition can be kept either constant or varied, as desired.

EXAMPLE 6

Currentless deposition of nickel from a nickel-boron-bath having a typical composition:
- 10 g/l of nickel as $NiCl_2 \times H_2O$;
- 15 g/l sodium glucolate ($HO—CH_2—COONa$);
- 1 g/l dimethylaminoboron $(CH_3)_2NBH_3$;
- 0.02 g/l led acetate $Pb(OOC—CH_3)_2$;
- at pH 5–6 and 65° C.

EXAMPLE 7

Currentless deposition of gold from a bath of a typical composition:
- 1–6 g/l of gold as gold cyanide ($KAu(CN)_2$;
- 10–15 g/l potassium cyanide KCN;
- 10–15 g/l potassium hydroxide KOH;
- 20–25 g/l potassium boron hydride $KBH_4$; at 75° C.

While the invention has been illustrated and described as embodied in specific examples, it is not intended to be limited to the details shown, since various modifications or structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling a process of a galvanic or chemical metallization of a surface immersed in an electrolytic or chemical bath, comprising the steps of exposing a surface portion being metallized to an incident beam of light, measuring the amount of light which is scattered off or reflected from said surface portion to determine a deviation from a nominal value; and varying at least one parameter of the process to neutralize the measured deviation.

2. A method as defined in claim 1, wherein said measuring step is carried out in situ.

3. A method as defined in claim 1, wherein said measuring step includes the measurement of intensity of the scattered or reflected light at an angle of reflection.

4. A method as defined in claim 1, wherein said incident light beam is monochromatic and substantially coherent in the visual or ultraviolet energy range.

5. A method as defined in claim 1, wherein said nominal value represents the total intensity of light scattered off or reflected within a narrow circle surrounding the incident beam of light.

6. A method as defined in claim 5, wherein said nominal value represents time variations of said total intensity.

7. A method as defined in claim 6, wherein said nominal value represents characteristic points or regions of the time dependency of the total intensity, such as maxima, minima, half width of maxima and minima, turning points, curve steepness or integrated intensity-/time functions.

8. A method as defined in claim 5, wherein the incident light beam is delimited by optical means.

9. A method as defined in claim 5, wherein said nominal value represents the interference structures within a definite scattering circle surrounding the incident light beam.

10. A method as defined in claim 9, wherein said nominal value represents the time variations of said interference structures.

11. A method as defined in claim 1, wherein said nominal value represents the intensity of a light beam directly reflected from said surface portion.

12. A method as defined in claim 11, wherein said nominal value represents the time variations of said directly reflected light beam.

13. A method as defined in claim 12, wherein said nominal value represents the characteristic points or regions of the time dependency of the intensity of the directly reflected light beam.

14. A method as defined in claim 1, wherein said nominal value represents the variations of intensity of the directly reflected light beam versus the energy of the incident light beam.

15. A method as defined in claim 14, wherein said nominal value represents a characteristic time variation of the reflection spectrum.

16. A method as defined in claim 1, wherein said process parameter includes time variations of the current density in an electrolytic bath.

17. A method as defined in claim 1, wherein said process parameter includes the electrode potential or the time variation of the electrode potential in an electrolytic bath.

18. A method as defined in claim 1, wherein the process parameter includes the temperature of the bath.

19. A method as defined in claim 1, wherein the process parameter includes the composition of products employed in the process.

20. A method as defined in claim 1, wherein the process parameter represents the convection of light process products in the bath.

21. A method as defined in claim 1, wherein the process parameter includes partial pressures of gases resulting in the bath.

22. A method as defined in claim 1, wherein said incident light beam is emitted by an He/Ne-laser.

23. A method as defined in claim 1, wherein said incident light beam is a monochromatic light beam emitted by a laser having a broad frequency range.

24. A method as defined in claim 1, wherein said incident light beam is directed perpendicularly against said surface portion.

25. A method as defined in claim 1, wherein said scattered off or reflected amount of light is measured at a characteristic angle relative to said surface portion.

26. A method as defined in claim 1, wherein said scattered off or reflected amount of light is integrated into a measuring light beam.

27. A method as defined in claim 1, wherein said incident light beam includes a plurality of component light beams collected and focused by optical means.

28. A method as defined in claim 1, wherein said measuring step includes the detection of the scattered off or reflected amount of light by a radiation sensitive detector.

29. A method as defined in claim 1, wherein said measuring step includes the storage and evaluation of measuring data in a microprocessor and conversion of the evaluated data into output commands for changing the process parameters.

30. A method as defined in claim 1, further including the step of coupling said measuring step with classical electrochemical methods of the current/potential registration in a quasi-stationary mode.

31. A method as defined in claim 1, controlling a momentary metal deposition comprising the control of all electrochemical deposition parameters.

32. A method as defined in claim 1, further comprising the step of recording said amount of scattered off or reflected radiation to check the metallization process.

33. A device for controlling a process of metallization of a surface in an electrolytic bath, comprising a source of radiation for generating a beam of a monochromatic, substantially coherent radiation in the visible and ultraviolet energy range, a first optical means for focusing said radiation beam on a surface portion being metallized, a second optical means for collecting the radiation directly reflected from or scattered at an angle from said surface portion, a radiation detector for measuring the intensity the radiation collected by said second optical means, means for registering and evaluating the measured data to determine a deviation from a nominal value; and means for varying at least one parameter of the process to neutralize said deviation.

34. The device as defined in claim 33, wherein said first and second optical means includes mirrors and lenses for collecting and focusing said radiation.

35. A device as defined in claim 33, wherein said electrolytic bath is contained in a container and said container being transparent to said radiation at least at locations of the entry and exit of said radiation beams.

36. A device as defined in claim 33, wherein said registration and evaluation means includes a microprocessor.

37. A device as defined in claim 33, wherein said source of radiation is a laser.

* * * * *